Aug. 13, 1940.  W. K. KINNEY  2,211,128
ELECTRIC SOLDERING IRON
Filed Oct. 17, 1939  3 Sheets-Sheet 1
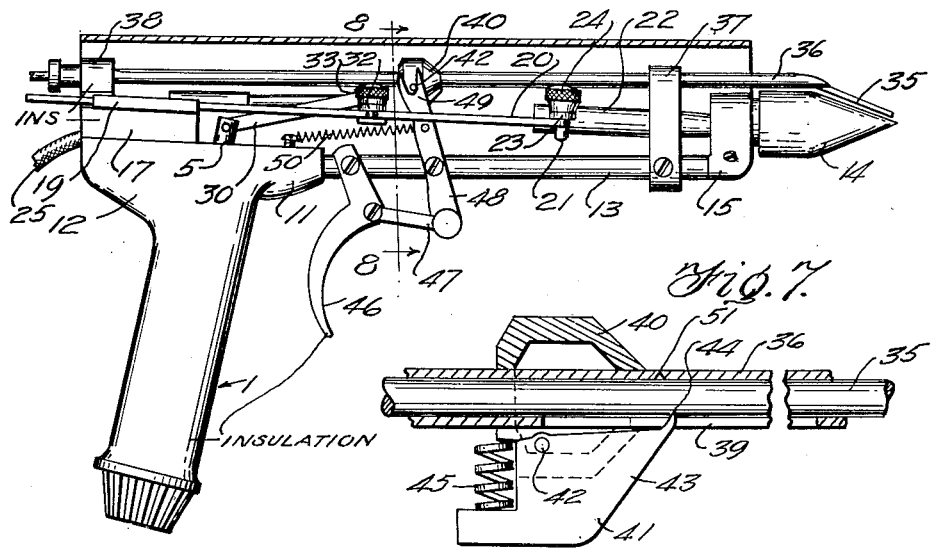
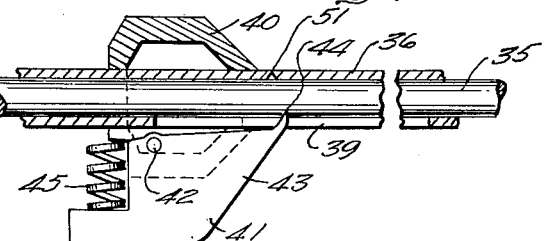
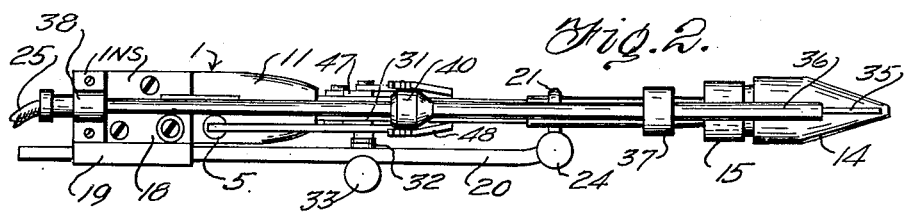
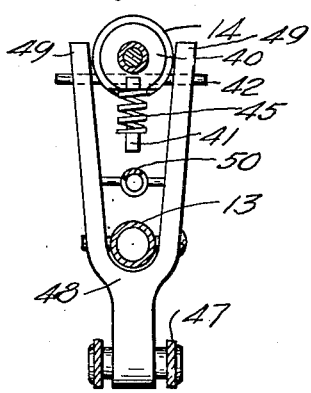
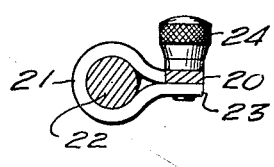
Inventor
Willmore K. Kinney,
By [signature]
Attorney Aug. 13, 1940.    W. K. KINNEY    2,211,128
ELECTRIC SOLDERING IRON
Filed Oct. 17, 1939    3 Sheets-Sheet 2

Inventor
Willmore K. Kinney,
By
Attorney

Aug. 13, 1940.  W. K. KINNEY  2,211,128
ELECTRIC SOLDERING IRON
Filed Oct. 17, 1939   3 Sheets-Sheet 3
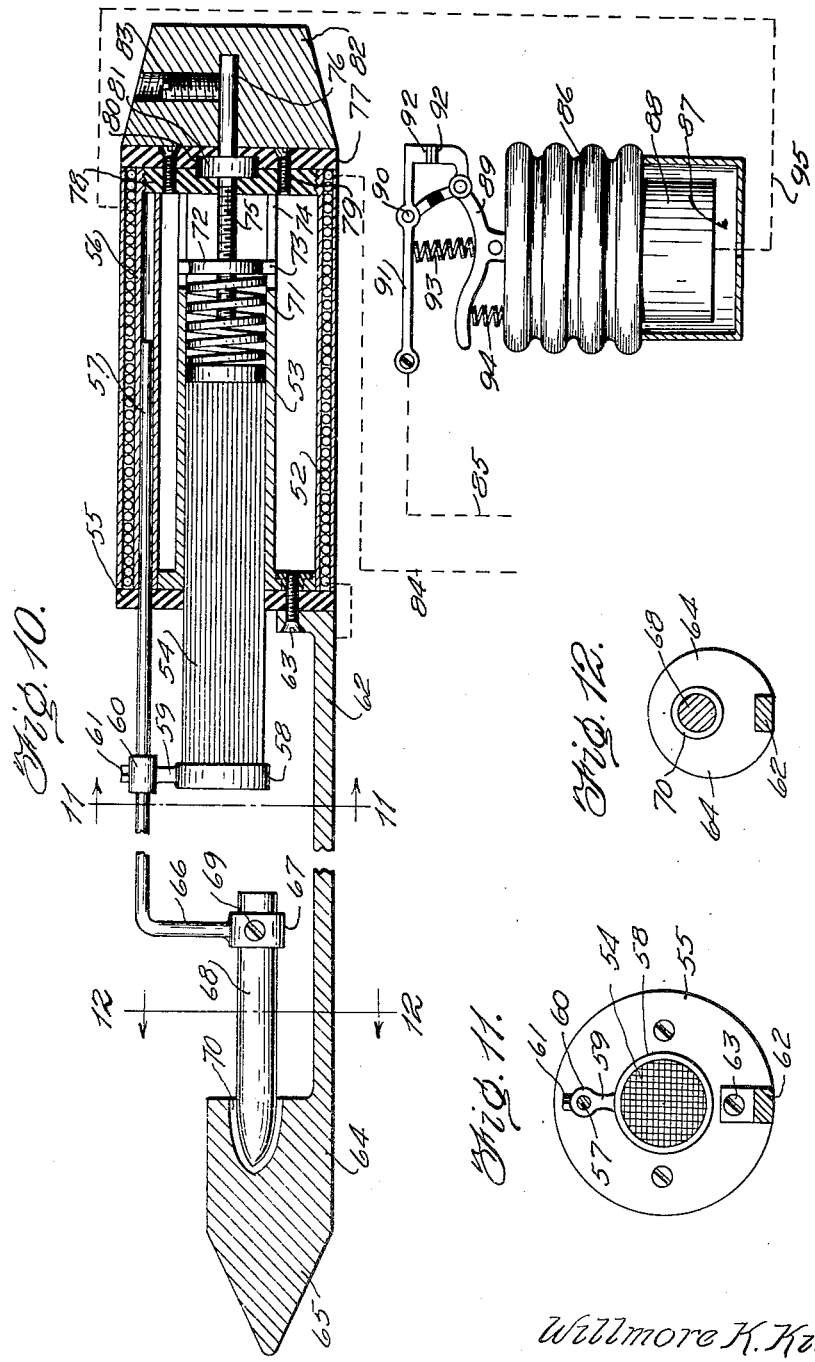

Patented Aug. 13, 1940

2,211,128

UNITED STATES PATENT OFFICE 2,211,128

ELECTRIC SOLDERING IRON

Willmore K. Kinney, Wellsburg, W. Va.

Application October 17, 1939, Serial No. 299,895

13 Claims. (Cl. 219—26)

This invention is directed to an improvement in electric soldering irons wherein the heating is accomplished through an electric arc in a manner to avoid direct flame contact with the soldering element proper, with the result of maintaining said element clean and operative at all times and under all conditions of use.

The primarly object of the present invention is the provision of an electric soldering iron in which the carbon member of the heating factor is subjected to a more or less constant vibration to insure and maintain a constant heat degree for the soldering element proper with means whereby the heat degree may be adjusted in a convenient manner to produce that heat characteristic at the soldering element proper best designed for the particular work in hand.

A further object of the invention is the utilization of a resistance element forming the sole connection with the carbon member and movable with the carbon member to avoid the use of wire heating elements to the carbon member, the resistance of the resistance element being such as to compensate for the resistance of the carbon member under various heat conditions to avoid overheating or underheating and utilize the effective heat source to the maximum permitted by the desired adjustment of the heat to be used.

A further object of the invention is the provision of a control for the resistance element and thereby of the carbon member which is responsive to a coil energized by an alternating current and acting to operate the resistance element in accordance with the coil energization, together with means whereby manual limit for the operative heat movement of the resistance element may be readily provided to vary the heat degree of the soldering member proper.

A further object of the invention is the provision of means for manually operating in a convenient manner the adjustment of the soldering flux in its cooperative relation with the soldering element proper for effective soldering function.

The invention is illustrated in the accompanying drawings, in which:

Figure 1 is a side elevation of the improved soldering iron, the closing guard being in section.

Figure 2 is a plan view of the soldering iron, the guard being omitted.

Figure 7 is a view in elevation, partly in section, showing an enlarged means for feeding the flux to the soldering unit.

Figure 8 is a section on line 8—8 of Figure 1.

Figure 9 is a view in elevation, partly in section, showing the means for connecting the resistance bar to the carbon member.

Figure 10 is a longitudinal sectional view, partly in elevation, of a modified form of soldering iron.

Figure 11 is a section on line 11—11 of Figure 10.

Figure 12 is a section on line 12—12 of Figure 10.

Figure 3:
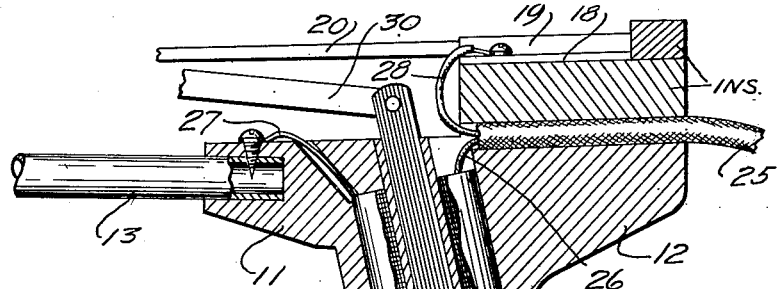
Figure 3 is an enlarged view in section, partly in elevation, showing the coil and adjusting means for controlling the heat.
Figure 4:
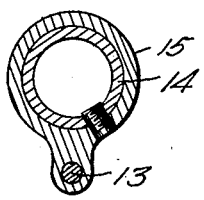
Figure 4 is a sectional view illustrating the position of the element cooperating with the carbon member in the formation of the arc and protecting the soldering element proper.

In the construction illustrated, the improved electric soldering iron comprises what may be termed a handle section 1 in the nature of a hollow insulated body preferably of wood or the like designed to form the handle to be held in the use of the soldering iron, and being of appropriate dimensions to accommodate the necessary details. This handle section 1 is closed at its lower end, as at 2, and within the handle section is provided a solenoid coil 3 having an inner brass core 4 within which is movably mounted an iron plunger 5.

Secured to the closed end 2 of the handle section is a movable cap 7 in which, through the medium of a set-screw 8, is secured a threaded rod 9 extending within the core 4 and carrying a stop 10 serving to limit the movement of the plunger 5 in the obvious adjustment of the cap 7. It is obvious that under energization of the coil, the plunger 5 will be operated through the magnetic force developed and that the extent of movement of this plunger in the operative direction may be regulated by adjusting the cap 7 and thereby the spring 10'.

The upper end of the handle section 1 is enlarged forwardly at 11 and rearwardly at 12 and on the forward enlargement is removably secured a rod-like element 13 which extends to and supports the soldering head proper indicated at 14. The rod-like element 13 is connected at its forward end to a sleeve 15 within which is removably positioned an iron member forming part of the arc assembly and to which the soldering head 14 is secured.

Secured to the upper end of the handle section 1 is a block 17 of insulating material on which is secured a plate-like member 18 having at one edge a hollow guide block 19, the bore of which is preferably rectangular. Movably mounted in the guide block is a resistance bar 20 which extends toward the soldering head 14 and is terminally extended laterally to form an eye 21 to receive the carbon member 22 of the arc assembly. The eye 21 has one section free of direct connection with the resistance bar 20, with the free terminal having a threaded extension 23 engaged by a cap 24, whereby the eye may be secured rigidly with the carbon member or freed with respect thereto to permit the replacement of the carbon member without disturbing any other portion of the apparatus.

It is, of course, apparent that when the cap 24 is fixed to secure the eye in fixed relation to the carbon member, such carbon member will move by and with the movement of the resistance bar 20 and, as will later appear, as the resistance bar constitutes the energy conducting element for the carbon member, it is apparent that no wire connections are necessary in this assembly.

Figure 5:
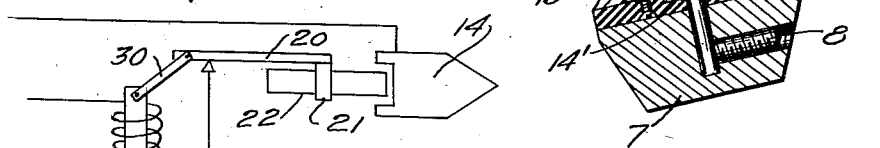
Figure 5 is a wiring diagram for the heating of the soldering element proper.
Figure 6:
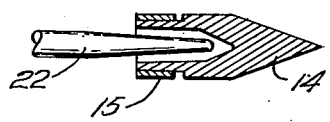
Figure 6 is a sectional view, partly in elevation, illustrating the arcing detail.

As will be more clear from Figures 3 and 5 of the drawings, a source of alternating current is led to the soldering iron, as indicated at 25, the arrangement of the conductor beyond the soldering iron being that best adapted for making connection with the available current source. One conductor 26 leads to the coil 3 and from the coil 3 through a conductor 27 to the rod element 13 and thereby to the iron section of the arc assembly. The other conductor 28 leads to the plate-like member 18 at 29, thereby energizing the resistance bar 20 to thereby energize the carbon member 22 of the arc assembly.

The plunger 5 extends above the handle section 1 and is provided with a pivotally connected rod 30 which in advance of the plunger is removably connected to the threaded end 31 of a clip 32 removably engaging the resistance bar 20 and secured in rigid relation to said bar by a manually operable cap 33. Thus, as the plunger 5 responds to the action of the solenoid, it will move upwardly and downwardly and in such movement elevate and lower the rod 30 and therefore reciprocate the resistance bar 20 and the carbon member 22 of the arc assembly. A spring 10' underlies the laminated cone 5, with a stop 10 between the spring and cone. A pusher plate 11' underlies the spring 10' and has diametric projections 12' resting in slots 13' in the inner brass core 4. A rod 9 is threaded in the pusher plate 11', and passes through a guide 14' held between plates 15' fixed to the core. The end of the rod extends into the cap 7 and is removably secured therein. Turning of the cap will adjust the cone 5. The core and coil are so arranged as to provide for the usual vibrating movement under A. C. current used.

The soldering flux, indicated at 35, passes through a tubular guide member 36 which is held in proper relation to the soldering element 14 by a bracket 37 which cooperates with the rod-like element 13. The guide member 36 extends rearwardly beyond the handle section 1 and is supported on a bracket 38 at the rear end. A flux of usual character is passed longitudinally through the guide member 36 and extended through the somewhat inclined normally elongated open element at the forward end of the guide member so that the flux is directed downwardly onto the soldering iron for appropriate delivery of the flux under the heat of the soldering member 14 for soldering purposes.

It is designed to manually feed the flux element to maintain a proper distribution of the same for soldering purposes. To this end, the guide element 36 is formed in its lower surface with a slot 39 and a feeding head 40 which slidably embraces the guide element 36. Secured to the feeding head 40 is a feeding strip 41 swingingly connected to the head by a pin 42. The strip has a portion which extends in parallelism to the guide element 36 and a portion in advance which inclines upwardly, as at 43, with a terminal point 44 which extends through the slot 39.

The flux 35 extends slidably through the guide element 36 and is engaged, in an operation to be described, by the pointed terminal 44 of the feeding strip 41. The feeding strip 41 is held in normal position by a spring 45 between the end opposite the pointed terminal 44 and the feeding head. Swingingly supported on the rod-like element 13 is a finger-piece 46, such finger-piece being of insulating material for obvious purposes. Connected to the finger-piece below the pivot of the rod-like element 13 is a double rod 47 connected to a lever 48 which is pivotally supported on the rod-like element 13, and extends upwardly with spaced ends 49 which removably receive the respective ends of a pin passing through the feeding head 40.

As the finger-piece 46 is moved rearwardly, the feeding head 40 is moved forwardly with respect to the soldering head and in this movement causes the pointed terminal 44 of the feeding strip 41 to engage in advance the flux strip 35. A spring 50 connected to the upper end of the handle section 1 and to the lever 48 is tensioned in the flux strip feeding movement so as to return such feeding parts to normal position for a subsequent feeding action when necessary.

The guide element 36 is formed on the inner surface and at a point diametrically opposite the slot 39 with a depression or notch 51 which is arranged to receive the feeding end 44 of the feeding strip 41 when the rear end of the flux 35 passes beyond the pointed terminal 44 so that no further feeding action can take place. When the pointed terminal 44 has under these conditions entered the channel 51, the spring 50 cannot return the parts to operative positions and the user is thereby notified that a further flux strip must be introduced.

A modified form of the invention is shown in Figures 10, 11 and 12, the principle of operation being the same as that of the preferred form but the construction and arrangement are somewhat varied. In this modified form the handle 1 by which the soldering iron is manually manipulated is entirely omitted and the device is cylindrical throughout the end engaging portion and handled in this manner.

The modified form comprises a rear cylindrical portion to be engaged by the hand in manipulating the soldering iron, which portion is largely constructed of the solenoid coil 52 having the usual iron setter sleeve 53 forming a channel for the movement of the core 54 of the solenoid. One end of the coil 52 has an insulating head or section 55 and mounted in the coil adjacent the peripheral edge thereof is a non-magnetic fixed guide 56 in which is slidably mounted one end of a German silver resistance bar 57 corresponding to the bar 20 of the preferred form.

The laminated core 54 has an end cap 58 having an outstanding stem 59 carrying a sleevelike socket 60 through which the German silver resistance bar 57 loosely passes and to which it may be rigidly connected at will by a set-screw 61. Connected to the head 55 in diametric opposition to the German silver resistance bar is a bar-like extension 62, the connection of the bar being through a set-screw 63.

The bar-like extension 62 is integral with an iron section 64 terminating in a soldering head 65. The German silver resistance bar 57 has a lateral projection 66 terminating in a socket 67 slidably receiving a carbon element 68 with the connection designed to be fixed at will by a set-screw 69. The forward end of the carbon element 68 is in the shape of a point seating in a correspondingly shaped opening 70 in the iron section 64.

The core 54 is of laminated form and its end within the coil bears against a spring 71, the opposite end of which spring engages a pusher plate 72, the diametrically opposed ends of which are formed with projections 73 seated in channels 74 formed in the member 53, whereby the pusher plate 72 is prevented from turning. An operating rod 75 is threaded through the pusher plate and formed with a plain terminal portion 76.

A plate 78 is threaded into the end of the coil to which plate a second closing plate 77 is secured by set-screws 79. The plates 77 and 78 are formed with cooperating recesses 80 on their meeting faces to receive a disk 81 which loosely embraces the threaded rod 75 forming a guide therefor. The part 76 of the rod 75 is extended into a manually operable cap 82 and removably held therein by a set-screw 83.

Under this construction, the operation of the manually operable cap 82 will, through the spring 71, force the core outwardly of the coil and permit it to move inwardly of such coil at desired adjustments. The coil is energized by an alternating current, one lead 84 of which is connected to the coil proper and the other lead 85 of which leads through a cut-out to be later described and from the cut-out to the guide 56 to energize the German silver resistance bar.

The coil and core are of the well known vibrating type; that is to say, the specific relations of these parts are such that incident to the alternating current employed and in the interval of non-energization of the coil, there is a tendency for the spring to force the core outwardly of the coil and upon the immediately succeeding energization of the coil, to tend to move the core inwardly of the coil.

In this connection, it is to be understood that the coil and core of the preferred form are constructed on the same principle so that there is a vibrating movement to an appreciable extent of the core in the operation of the device.

As in the preferred form, the manually operable cap 82 is operated to move the core and thereby the German silver resistance bar to a point to cause actual contact between the carbon strip 68 and the iron section 64. Following inauguration of the power, the manually operable cap 82 is moved in the opposite direction causing the core to move under the influence of the coil to space the carbon strip 68 from the member 64 to inaugurate the arc. The adjustment is continued until an arc of sufficient heat generation for the particular job in hand is struck. Under the vibrative movement of the core there is a continual slight change in the influence of the arc which, while not affecting the heat of the particular arc on the soldering head, will nevertheless tend to a more perfect arc influence and a corresponding minimum burning of the carbon strip. The vibration of the arc will thus generate its maximum heat and continually interrupt to a slight extent this maximum heat but as the interruption is minute as to distance and rapid as to succession, the heat to which the soldering head is subjected by the arc is not interrupted but the saving of the burning influence on the carbon strip is quite noticeable. This effect, therefore, tends to a more perfect operation of the soldering iron with the maximum life of the carbon strip without interfering with that degree of heat for which the implement may be set.

In order to avoid any possibility of an excess heat, the implement includes a cut-out comprising an expanding element 86 containing a heat-responsive liquid below which is arranged a casing 87 having a heat-responsive resistance 88. The heat expanding member 86 pivotally carries a switch arm 89 connected at 90 to a bar 91 forming part of the assembly. The terminals of the bars 88 and 91 provide contacts 92 and a spring 93 is interposed between the switch arm 89 and bar 91 to insure return of the expanding element and a switch 94 is arranged relative to the arm 89 to normally maintain contact between the contacts 92 when the cut-out is inoperative. The service lead 85 is connected to the arm 91 and continues through the cut-out leading from the heating element 88 as conductor 95 which is terminally connected to the guide 56 of the German silver resistance bar.

Of course, it is understood that the coil 52 may be covered by insulating and heat-resistive material to provide a hand-hold though this is not necessary to illustrate.

It is further to be understood that the means shown for feeding the flux in Figure 1 is to be duplicated in the modified form. Illustration of this in Figure 10 is unnecessary by reason of the fact that it is clearly shown in Figure 1.

From the above description it will be apparent that with the use of an alternating current, the coil compels movement of the plunger to thereby through the elements described correspondingly move the carbon member. When the carbon member has been moved under the magnetic influence of the coil, it will be apparent that the carbon member is shifted to a position to permit a proper arcing cooperation with the cooperating arcing element and it is to be noted in this connection that the German silver resistance bar having a resistance equal to that of the operative length of the carbon member prevents undue surge of current in the adjustment. Through the adjustment of the stop 10 of Figure 1 or the pusher plate 72 of Figure 10, the movement of the plunger under the magnetic influence of the coil is limited as desired to obviously position the carbon member in desired adjusted relation to the cooperating element to thereby vary the heat effect of the current. When the magnetic influence of the coil is relieved incident to the alternating current, the spring tends to move it in the opposite direction to a limited degree to thereby induce the vibration referred to to overcome burning effect and to permit adjustment to a proper arcing degree as the coil again influences the plunger.

The flux is manually fed in the manner described through the operation of the manually movable elements 46 and when the flux has reached a point beyond further feed of such flux in the operative direction, it will cause the pointed terminal 44 under the influence of the spring 42 to move into the notch 51 locking the feeding means against return movement and advising the user that a renewal of the flux is necessary.

It is to be particularly noted that the fusible element is entirely free of wire connection within the soldering iron proper and hence there is no liability of breakage, burning or short-circuiting in this connection. Furthermore, the carbon member 22 can, by release of the connection 24, be bodily removed from the soldering iron and replaced by a new carbon when desired without the necessity of disconnecting any other part.

What is claimed to be new is:

1. A soldering iron including a solenoid coil, a core therein, a source of alternating current for the solenoid, and an arc producing assembly energized by the alternating current and including a carbon element connected to the core, and means for automatically vibrating the core within the coil to thereby agitate the carbon element during the maintenance of the arc.

2. A soldering iron including a solenoid coil, a core therein, a source of alternating current for the solenoid, and an arc producing assembly energized by the alternating current and including a carbon element connected to the core, a spring in the coil for maintaining the core against magnetic balance within the coil and serving to influence the core in opposition to the coil, the core being constructed for vibration by means of the current and said spring within the coil to thereby agitate the carbon element during arc formation.

3. A construction as defined in claim 2, wherein the spring is set to limit the operative formation of the arc.

4. A construction as defined in claim 2, wherein the coil forms the handle for the manipulation of the soldering iron.

5. A soldering iron including a handle section, a solenoid arranged in the handle section, a plunger operated by the solenoid, an arcing assembly including a carbon, a connection of German silver bar removably connected to the carbon, means for causing movement of the plunger to actuate the German silver bar and thereby the carbon in vibrative effect under the influence of the coil, and an alternating current supply energizing the coil.

6. An electric soldering iron including a soldering head, an arcing assembly arranged within the head and including a carbon section and an iron section, a German silver resistance bar removably connected to the carbon section, a handle section, a solenoid in the handle section, a plunger operated by the solenoid, a connection between the plunger and the German silver resistance bar, a second bar carried by the handle section and connected to the iron section of the arc, and an alternating current supply having a conductor leading to the German silver resistance bar and a second conductor through the coil and the iron section to the second bar.

7. A construction as defined in claim 6, including manually operable means for controlling movement of the plunger under the energization of the coil.

8. A construction as defined in claim 6, including manually operable means for controlling movement of the plunger under the energization of the coil, and a spring for operating the plunger in a direction away from the adjusting means.

9. An electric soldering iron including a soldering head, an arcing assembly arranged within and serving to heat the soldering head, means for energizing the arcing assembly, said means avoiding the use of wire and including rod-like elements, means for feeding the flux to the soldering head including a manually operable feeding element, and means for interlocking the feeding element when the flux has passed in the operative direction beyond said feeding element.

10. An electric soldering iron including a soldering head, an arcing assembly arranged within and serving to heat the soldering head, means for energizing the arcing assembly, said means avoiding the use of wire and including rod-like elements, means for feeding the flux into operative relation with the soldering head comprising a rod through which the flux is freely movable, a member supported on and longitudinally movable with respect to the head, an element connected to the member and having a pointed terminal passing through a slot in the rod to engage the flux, a recess in the rod to receive the pointed terminal when the flux has passed beyond such terminal in the feeding direction, and a spring for forcing the pointed terminal into said recess in the absence of flux in line therewith.

11. A construction as defined in claim 10 wherein the movable member is connected to a manually insulated element movably supported on and with respect to one of the arcing assembly members.

12. An electric soldering iron including a handle section, a German silver resistance bar carried by and movable with respect to the section, means at the end of the bar remote from the handle section being formed to removably receive a carbon element of the arcing assembly, a carbon element fixed at will in said means, a cooperating arcing element cooperating with the carbon, a soldering head removably supported by said cooperating element, a bar removably secured to the cooperating element and extending to the handle section, a coil within the handle section, a plunger in said coil and responsive to the magnetism thereof, a connection between the coil and said resistance bar, and a source of alternating current connected to the resistance bar immediately adjacent the head, to the solenoid and to the bar leading from the head and to the arcing element cooperating with the carbon.

13. A construction as defined in claim 12 including a stop movable in the coil in line with the plunger, a rod threaded in the handle section to move the stop in either direction, and a manually operable element to which the threaded rod is connected whereby the play of the plunger under the energization of the solenoid may be regulated at will.

WILLMORE K. KINNEY.